United States Patent
Gandhi et al.

(10) Patent No.: US 9,116,879 B2
(45) Date of Patent: Aug. 25, 2015

(54) DYNAMIC RULE REORDERING FOR MESSAGE CLASSIFICATION

(75) Inventors: Mauktik H. Gandhi, Redmond, WA (US); Shashank Kavishwar, Redmond, WA (US); Charles W. Lamanna, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 793 days.

(21) Appl. No.: 13/115,804

(22) Filed: May 25, 2011

(65) Prior Publication Data

US 2012/0303624 A1  Nov. 29, 2012

(51) Int. Cl.
G06F 17/30 (2006.01)
G06F 17/27 (2006.01)
H04L 12/58 (2006.01)

(52) U.S. Cl.
CPC ............ *G06F 17/2785* (2013.01); *H04L 51/12* (2013.01); *H04L 51/22* (2013.01)

(58) Field of Classification Search
CPC ................................................ G06F 17/30595
USPC .................. 707/687, 706, 736, 740, 758, 813
See application file for complete search history.

(56) References Cited

U.S. PATENT DOCUMENTS

| | | | |
|---|---|---|---|
| 6,654,787 B1 | 11/2003 | Aronson et al. | |
| 7,590,694 B2 | 9/2009 | Yu | |
| 7,716,297 B1 | 5/2010 | Wittel et al. | |
| 7,734,627 B1 | 6/2010 | Tong | |
| 7,814,545 B2 | 10/2010 | Oliver et al. | |
| 2004/0073617 A1 | 4/2004 | Miliken et al. | |
| 2004/0162795 A1 | 8/2004 | Dougherty et al. | |
| 2005/0060643 A1 | 3/2005 | Glass et al. | |
| 2005/0102366 A1 | 5/2005 | Kirsch | |
| 2005/0108340 A1 | 5/2005 | Gleeson et al. | |
| 2005/0120019 A1 | 6/2005 | Rigoutsos et al. | |
| 2009/0089869 A1 | 4/2009 | Varghese | |
| 2009/0307771 A1 | 12/2009 | Rajan et al. | |
| 2010/0117683 A1* | 5/2010 | Karczmarek et al. ........... 326/93 |

(Continued)

OTHER PUBLICATIONS

Ray Hunt, et al., Current and New Developments in Spam Filtering—Published Date: Sep. 2006 http://ieeexplore.ieee.org/stamp/stamp.jsp?arnumber=04087712.

(Continued)

*Primary Examiner* — Sana Al Hashemi
(74) *Attorney, Agent, or Firm* — Louise Bowman; Aaron Hoff; Micky Minhas

(57) ABSTRACT

Embodiments are directed to generating a customized classification rule execution order and to identifying optimal ordering rules for previously processed data. In an embodiment, a computer system fingerprints a message received via a computer network. The fingerprinting identifies specific characteristics of the message. The computer system compares the message's fingerprint to various stored message fingerprints generated from previously received messages. The comparison determines that the fingerprint does not match the stored fingerprints. The computer system applies classification rules to the message according to a predetermined rule execution order to determine a classification for the message. The computer system then generates a customized classification rule execution order to order those classification rules that optimally identified the message's class at the top of the customized classification rule execution order.

20 Claims, 4 Drawing Sheets

(56) References Cited

U.S. PATENT DOCUMENTS

2010/0254567 A1    10/2010    Kim
2010/0312769 A1*   12/2010    Bailey et al. .................. 707/740

OTHER PUBLICATIONS

Jonathan Zdziarski, et al., Approaches to Phishing Identification Using Match and Probabilistic Digital Fingerprinting Techniques—Retrieved Date: Feb. 21, 2011 http://www.trustedsource.org/download/research_publications/phishing.pdf.

Schleimer et al. "Winnowing: Local Algorithms for Document Fingerprinting", 2003 ACM SIGMOD International Conference on Management of Data, New york, Jun. 2003, pp. 76-85.

"First Office Action and Search Report Received for Chinese Patent Application No. 201280024973.8", Mailed Date: Jun. 1, 2015, 12 Pages.

* cited by examiner

DYNAMIC RULE REORDERING FOR MESSAGE CLASSIFICATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to identify and filter certain types of messages. For example, anti-spam applications or services may be configured to analyze email messages and determine which messages are spam messages. Those messages identified as spam may be filtered out by the application so that they are not delivered to the end user. The application that identifies spam messages may identify the spam messages by applying various rules to the message. If a certain number of the rules apply to the message, the message is identified as spam and is discarded.

BRIEF SUMMARY

Embodiments described herein are directed to generating a customized classification rule execution order and to identifying optimal ordering rules for previously processed data. In one embodiment, a computer system fingerprints a message received via a computer network. The fingerprinting identifies specific characteristics of the message. The computer system compares the message's fingerprint to various stored message fingerprints generated from previously received messages. The comparison determines that the fingerprint does not match the stored fingerprints. The computer system applies classification rules to the message according to a predetermined rule execution order to determine a classification for the message. The computer system then generates a customized classification rule execution order to order those classification rules that optimally identified the message's class at the top of the customized classification rule execution order.

In another embodiment, a computer system fingerprints a message received via a computer network. The computer system compares the message's fingerprint to various stored message fingerprints generated from previously received messages. The comparison determines that the fingerprint matches one or more of the stored fingerprints. The computer system accesses a previously generated customized classification rule execution order corresponding to the matched fingerprint and applies the accessed customized classification rule execution order to the message to determine a classification for the message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
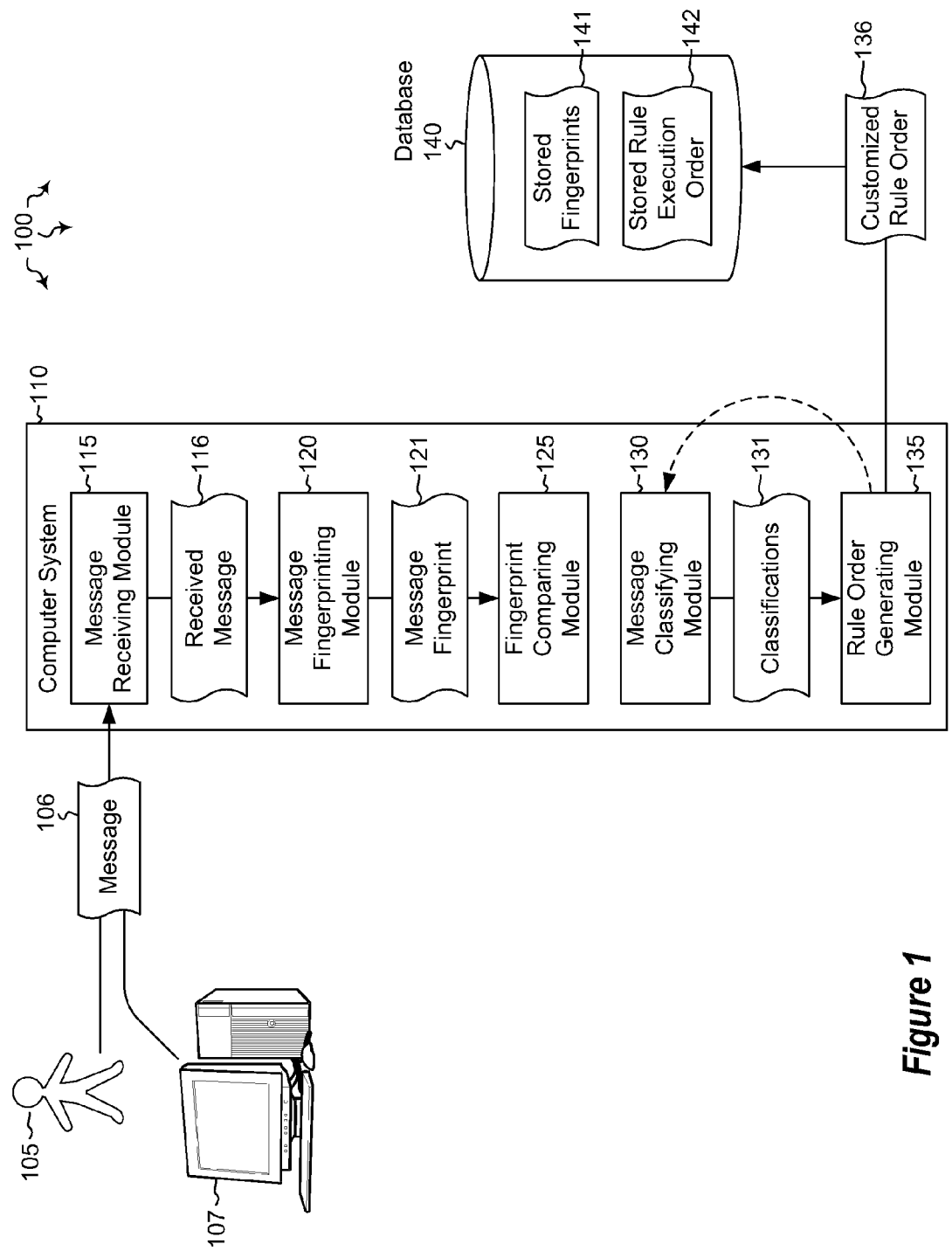
FIG. 1 illustrates a computer architecture in which embodiments of the present invention may operate including generating a customized classification rule execution order and identifying optimal ordering rules for previously processed data.

Embodiments described herein are directed to generating a customized classification rule execution order and to identifying optimal ordering rules for previously processed data. In one embodiment, a computer system fingerprints a message received via a computer network. The fingerprinting identifies specific characteristics of the message. The computer system compares the message's fingerprint to various stored message fingerprints generated from previously received messages. The comparison determines that the fingerprint does not match the stored fingerprints. The computer system applies classification rules to the message according to a predetermined rule execution order to determine a classification for the message. The computer system then generates a customized classification rule execution order to order those classification rules that optimally identified the message's class at the top of the customized classification rule execution order.

In another embodiment, a computer system fingerprints a message received via a computer network. The computer system compares the message's fingerprint to various stored message fingerprints generated from previously received messages. The comparison determines that the fingerprint matches one or more of the stored fingerprints. The computer system accesses a previously generated customized classification rule execution order corresponding to the closest matched fingerprint and applies the accessed customized classification rule execution order to the message to determine a classification for the message.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Systems that are used to detect characteristics of a message may do so by running a message through a series of classification rules, or simply "rules" herein. Each rule is used to detect some pattern within the message. If the pattern is detected, the overall confidence of the characteristic is updated by the value specified by that rule. This rule is considered as 'hit' or 'matched' by the system (e.g. computer system 110 of FIG. 1). Once the confidence for the characteristic reaches a certain predetermined value, the execution of the remaining rules may be skipped in order to reduce execution time.

In some embodiments, computer system 110 may be a spam detection system. It may use a series of rules which look for a pattern within the message. If that pattern is detected (i.e. the rule matched), the total spam score may be updated by the value specified by the rule that matched. Once the spam score hits a particular predefined threshold, the message is classified as spam and the processing of the rest of rules is skipped.

In some cases, the classification rules may be sequentially executed on the message being processed. In some instances, only a subset of the rules will match the message. Those rules that do not match the message are not executed, as they have a processing cost and do not increase the final confidence value. The rules that do match may be reordered for that message or type of message. In this manner, the rules execution order may be changed for and may be specific to each message. For each message there is an optimal rule order where the rules that match and contribute to the overall confidence are executed first. In such scenarios, the rules that do not match will not be executed. Once the confidence threshold is reached, further rules do not need to be executed, and rule execution is halted.

In some embodiments, fingerprinting (e.g. module 120) may be used to detect messages that are similar and then apply a computed optimal rule order (e.g. 136) to similar messages that are processed in the future. Thus, fingerprinting is used to detect common "classes" of messages, and then apply a rules ordering optimal for that particular class of messages. In cases where fingerprinting is implemented, the message "classes" do not need to be pre-defined or determined out of band. Rather, these "classes" are "clusters" of similar messages as detected by fingerprinting, dynamically identified and adjusted while the system is operating, substantially (or entirely) without user intervention.

Computer system 110 may be configured to process and fingerprint incoming messages. For instance, message 106 may be sent to message receiving module 115 from user 105 or computer system 107. Each received message 116 is fingerprinted by message fingerprinting module 120. The fingerprint identifies certain characteristics of the message and may be used to classify the message as being a certain type of message (e.g. spam). The fingerprint 121 may further be used to detect previously processed messages that were similar. Here, it should be noted that fingerprinting does not require an exact match and may detect messages that are similar or substantially similar.

Fingerprint comparing module 125 may compare the message fingerprint 121 to other previously generated and stored fingerprints 141. The previously generated fingerprints are fingerprints that were generated from other previously received messages. The stored fingerprints may be stored in database 140. If the fingerprint for the newly received message does not match any previously processed messages, the message is processed by the predetermined classification rules in the system whose order is static and is determined at configuration time of the system. Based on which rules match, a new more optimal rule execution order is computed for the message by rule order generating module 135. The computed rule order 136 is associated with that message fingerprint 121 and saved in the system for future messages (e.g. stored rule execution orders 142).

If the message fingerprint 121 does match a previously processed message (i.e. one of the stored fingerprints 141), the message is processed by the rules in the optimal order computed for the corresponding previously generated fingerprint. The outcome of the processing may be used to refine the rule ordering. In some cases, an optimal rules ordering may be stored only for fingerprints that sufficiently frequently match messages. In these cases, fingerprints that are not used very often can be removed, while fingerprints that are used with regularity will be kept. The determination as to which fingerprints are used sufficiently frequently may be based on the total number of matches or the number of matches in a specified time period (e.g. less than 3 matches in 5 minutes). The total number of message fingerprints and associated optimal rules ordering may be varied according to storage cost and other considerations.

As explained above, fingerprints may be used to detect similar messages. Computing whether two pieces of data are similar may include two aspects: 1) The similarity process itself may be applied to only a subset of the actual data based on the current needs of the consuming system. For example, in embodiments where computer system 110 is a spam detection system, the similarity may be computed only for the email body if the rules run on the body, or the subject if the rules apply to the subject. 2) Checking if two messages are similar may involve a threshold which is to be reached for the two messages to be considered similar. When two pieces are compared, they may have a similarity value can ranging from 0% (i.e. messages whose text is completely different) to 100% (i.e. the text of the messages is identical). A threshold of, for example, 70% may be used as a threshold to mark two messages or pieces of text as 'similar'.

To perform the fingerprinting, module 120 may implement the b-bit Minwise hashing algorithm (as it is generally known in the art) to generate a fuzzy fingerprint for a given message or piece of text. The similarity of two pieces of text is computed using the similarity of their fingerprints. At least in some cases, comparing fingerprints is significantly faster than comparing the text itself. A message's fingerprint (e.g. 121) may be compared to multiple different stored fingerprints 141 that are stored in database 140. Indexing may be used to quickly compare newly generated fingerprints to the stored fingerprints.

The rule order generating module 135 may be configured to compute optimal rule order for each fingerprint, or for each class of messages. That computed rule execution order may then be used to process similar messages received in the future. Fingerprinting is used to detect if two messages are similar. If the compared messages are similar, the computed optimal rule order of the first message processed by the system may be used when processing the second message. The similarity of the two messages is used to compute the approximate optimal rule order for the second message from the computed rule order of the first message.

In such a system, the first message is processed using a static, preconfigured rule order to get the characteristic outcome (e.g. whether it is spam or not). The rule match outcome may also be used to compute the optimal rule order for the message. This rule ordering may not be important for that specific message processing as the characteristic outcome for the message was already determined by the system; however, it can be used when processing similar messages in the future.

In one example, a spam detection system is used that has 100 rules [R1 . . . R100] that execute sequentially. Message M is processed by the system and it matches 5 rules {R35, R40, R50, R70, R86}. The rule processing is stopped at rule R86 as the confidence threshold is reached with that rule. An optimal rule order is determined for this message (OM=[R35, R40, R50, R70, R86 . . . remaining rules in any order]). If message M were processed in this system with the rules ordered as specified by OM, the confidence threshold would be reached after executing only 5 rules instead of the 86 that were done in the original system. The optimal rule execution order for message M was computed after the message M was executed making the computed rule order useless for the processing of message M. However, if a subsequently received message N is processed by the system and is similar to message M with a substantially high similarity score (e.g. 70%), the computed rule order OM can be applied to message N as an approximate (and appropriate) rule order for message N.

In some embodiments, variations of the above may be implemented. For example, in one variation, a system may be used the implements rules that add a positive and a negative score for each rule. The rule order generating module may generate a customized rule execution order for a subset of the rules (e.g. only the positive rules, or only the negative rules. In such systems, the negative rules may be executed before the positive rules for reliability of the system. Thus, the negative rules may be executed first in a static order, and then the positive rules are executed in the optimal order.

In another variation, when a newly received message fingerprint matches a previously generated message fingerprint, and the customized rule order corresponding to the previously generated fingerprint is used for processing the newly received message, the optimal rule ordering for the previously generated fingerprint may be updated based on the results of the current message processing. Thus, if certain rules match in the processing of the new message that were different from the rules that matched the older message, the processing order for these types of messages may be updated according to the rules that matched the new message.

Another variation is similar to the above, but instead of updating the rule order of the previous message, the new message and its computed rule order are saved in database 140. When a third, subsequent message is received that matches both of the prior two messages, a rule order is used that is either 1) a combination of the rule order of the first two messages or 2) the rule order of the message that is most similar to the third message. In yet another variation, containment may be used instead of similarity when matching messages to get the optimal rule ordering. If the original message is completely contained within the new message, the computed rule ordering from the original message is applied to the new message. Here, no rule order is computed for the subsequently received message. These and other concepts will be explained further below with regard to methods 200 and 300 of FIGS. 2 and 3, respectively.

Figure 2:
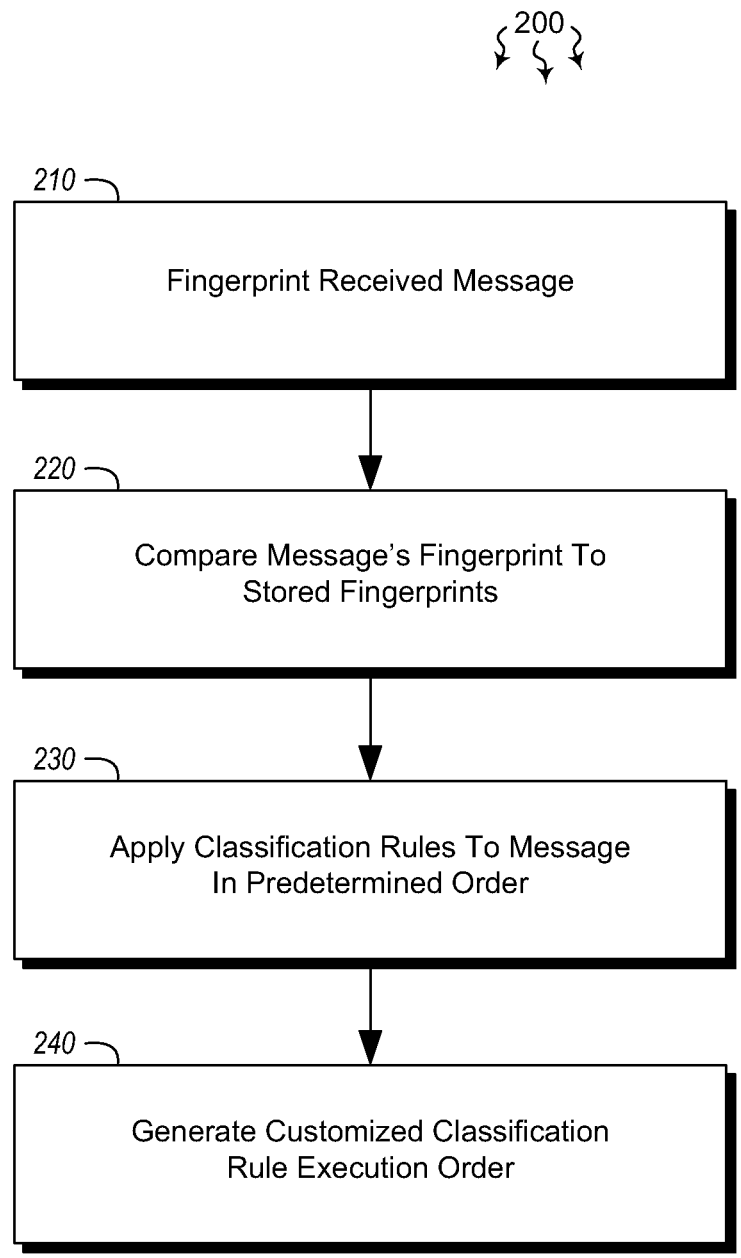
FIG. 2 illustrates a flowchart of an example method for generating a customized classification rule execution order.
Figure 3:
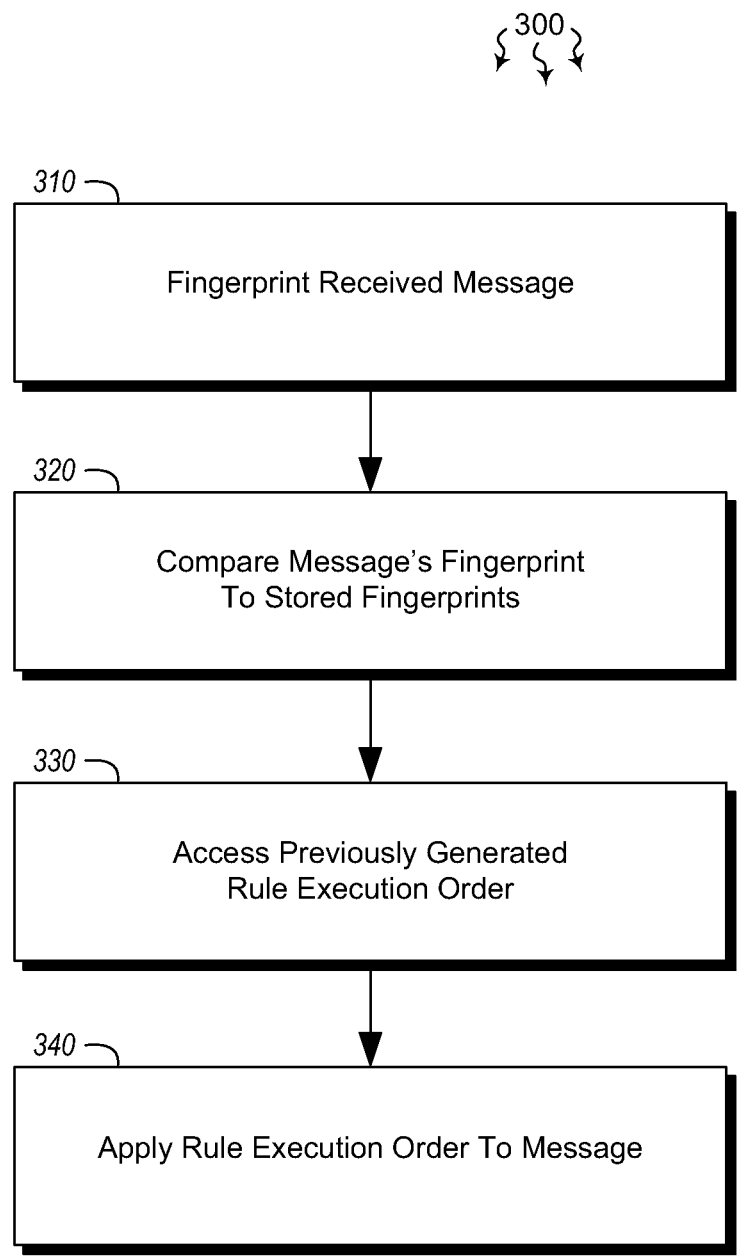
FIG. 3 illustrates a flowchart of an example method for identifying optimal ordering rules for previously processed data.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for generating a customized classification rule execution order. The method 200 will now be described with frequent reference to the components and data of environment 100 of FIG. 1, as well as FIGS. 4A and 4B.

Method 200 includes an act of fingerprinting a message received via a computer network, wherein the fingerprinting identifies one or more specific characteristics of the message (act 210). For example, message fingerprinting module 120 may fingerprint received message 116 (received by module 115). The fingerprint 121 may identify different characteristics about the message. Messages that are similar or substantially similar may be given the same or very similar fingerprints. Accordingly, a fingerprint assigned to one message may be used to identify messages that are similar to the initial message.

Method 200 also includes an act of comparing the message's fingerprint to one or more stored message fingerprints generated from previously received messages, wherein the comparison determines that the fingerprint does not match the stored fingerprints (act 220). For example, fingerprint comparing module 125 may compare message 116's fingerprint 121 to various other stored fingerprints 141 that were generated from other, previously received messages. The comparison may determine that the message's fingerprint matches or does not match any of the stored fingerprints. In this case, the comparison module determines that the message's fingerprint does not match any of the stored fingerprints.

Figure 4B:
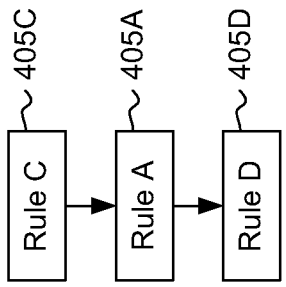
FIGS. 4A and 4B illustrate an embodiment where rule execution orders are changed.
Figure 4A:

Next, method 200 includes an act of applying one or more classification rules to the message according to a predetermined rule execution order to determine a classification for the message (act 230). For example, message classifying module 130 may apply various classification rules according to a predetermined (possibly static) execution order to determine a classification 131 for the received message 116. The predetermined rule execution order is generic in the sense that it is independent of the fingerprint or characteristics of the message. As shown in FIG. 4A, rules 405A, 405B, 405C and 405D may each be executed in sequential order. This may represent the predetermined, static execution order 401A. A new, customized classification rule execution order (136/401B) may be generated and used when executing messages similar to or the same as the received message.

The custom classification rule execution order 401B may order those classification rules that optimally identified the message's class (rules 405C, 405A and 405D) at the top of the customized classification rule execution order (act 240). Thus, the rules may be re-ordered according to which rules optimally identified the message's class (e.g. personal message, high priority message, spam message, etc.). The "optimal" identification may refer to optimally identifying a message's class in terms of execution cost (i.e. using the lowest possible execution cost) or in terms of accuracy (i.e. resulting in the highest possible accuracy). It should be understood that substantially any number of rules may be used, re-ordered or removed, and that the re-ordering may occur dynamically at any time.

As mentioned above, systems may be used where the classification rules include positive score rules and negative score rules. In some cases, the customized classification rule execution order may be determined solely for the positive score rules (or solely for a different subset of rules such as the negative score rules). When using these systems, the negative score rules may be executed before the positive score rules. Thus, if the negative score rules match the message (i.e. identify that the message is not a match to the previously stored message fingerprints), then the positive score rules are not executed (as it is already apparent that the message does not match). Avoiding execution of the positive score rules may reduce processing loads.

The customized classification rule execution order 136 may be further refined by storing only those fingerprints that match messages on a sufficiently frequent basis. Thus, if a given fingerprint continues to match other received messages on a frequent basis (e.g. a threshold level), it will be kept in database 140. If it does not match at the threshold level, it will be removed. Once a customized classification rule execution order has been generated for a given message/fingerprint, that rule execution order is associated with that message/fingerprint.

In some cases, a message may be received after the initially received message 116 has been processed. The subsequent message may be fingerprinted by module 120. Fingerprint comparing module 125 may determine that the fingerprint of the subsequently received message matches the fingerprint generated for the original message 116. Message classifying module 130 may use the generated customized classification rule execution order generated for the first message to process the subsequently received message. The generated customized classification rule execution order may be further refined based on the execution of the subsequently received message.

In another embodiment, multiple messages may be received after the initial message 116. A first subsequent message may be received and saved. A corresponding customized classification rule execution order may be determined for the first subsequent message. Then, a second subsequent message may be received. The computer system 110 may then determine that the second subsequent message matches both the originally received message and the first subsequent message. In one case, a combination of the customized classification rule execution order of the original message and the customized classification rule execution order of the first subsequent message may be applied. In another case, either the customized classification rule execution order of the original message or the customized classification rule execution order of the first subsequent message may be applied, according to which is the most similar to the second subsequent message's customized classification rule execution order. In yet another case, a subsequent message may be received. The computer system may determine that the original message is included in the subsequent message, and may apply the customized classification rule execution order of the original message.

FIG. 3 illustrates a flowchart of a method 300 for identifying optimal ordering rules for previously processed data. The method 300 will now be described with frequent reference to the components and data of environment 100.

Method 300 includes an act of fingerprinting a message received via a computer network, wherein the fingerprinting identifies one or more specific characteristics of the message (act 310). For example, message fingerprinting module 120 may fingerprint message 116, resulting in message fingerprint 121. Fingerprint comparing module 125 may compare the message's fingerprint to one or more stored message fingerprints 141 generated from previously received messages. The comparison may determine that the fingerprint 121 matches one or more of the stored fingerprints (act 320). Message classifying module 130 may access a previously generated customized classification rule execution order 142 that corresponds to the matched fingerprint (i.e. the fingerprint of message 116) (act 330). The accessed customized classification rule execution order may be applied to the message to determine a classification for the message (act 340).

After processing the subsequently received message, the customized classification rule execution order may be refined based on the execution of the customized classification rule execution order on the received message 116. If certain rules were not used, they may be re-ordered (i.e. moved lower in the list) in the rule execution order. Other rules that optimally identified the message's class may be retained and moved to the top of the rule execution order.

In some cases, the customized classification rule execution order is changed dynamically based on one or more portions of aggregated data (e.g. statistical data or other types of data). The generated customized classification rule execution order 136 may comprise the least number of classification rules used to properly classify a message. Thus, rules may be applied to a message until a classification has been determined. The least number of rules used to classify the message (i.e. to reach the threshold certainty percentage) may be stored as the new, customized rule order. The rules that best identified the message's class may be placed at the beginning of the rule execution order. Moreover, in some cases, rules that did not match (and thus did not aid in identifying the message's class) may be removed from the optimal rule execution order. In FIG. 4B, for example, rule 405B was removed. In other cases, the rules that did not match may be or re-ordered within the rule execution order.

Accordingly, methods, systems and computer program products are provided which generate a customized classification rule execution order. Fingerprints are used to identify messages, and then customized rule orders corresponding to those fingerprints are used to process the messages. Moreover, methods, systems and computer program products are provided which identify optimal ordering rules for previously processed messages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for generating a customized classification rule execution order, the method comprising:

identifying one or more specific characteristics of a message received via a computer network;

fingerprinting the message based at least in part on the identified one or more specific characteristics of the message;

comparing the message's fingerprint to one or more stored message fingerprints generated from previously received messages, the comparison determining that the fingerprint does not match the stored fingerprints;

applying a plurality of classification rules to the message to determine a classification for the message, the rules applied sequentially according to a predetermined rule execution order; and generating a customized classification rule execution order, based on the results of the sequential application in the predetermined order of the plurality of classification rules to the message, the customized classification rule execution order defining a new sequential order of the classification rules that optimally identifies the message's class by applying the fewest number of rules of the customized classification rule execution order when applied sequentially to the message.

2. The method of claim 1, further comprising associating the generated customized classification rule execution order with the fingerprint for the message.

3. The method of claim 2, further comprising:

an act of fingerprinting a subsequently received message;

an act of determining that fingerprint of the subsequently received message matches the fingerprint generated for the original message; and an act of using the generated customized classification rule execution order to process the subsequently received message.

4. The method of claim 3, further comprising refining the generated customized classification rule execution order based on the execution of the subsequently received message.

5. The method of claim 1, wherein the customized classification rule execution order is changed dynamically based on one or more portions of aggregated data.

6. The method of claim 1, wherein the classification rules are placed at the beginning of the rule execution order.

7. The method of claim 6, wherein the generated customized classification rule execution order comprises the least number of classification rules used to properly classify a message.

8. The method of claim 1, further comprising refining the customized classification rule execution order for fingerprints that match messages on a sufficiently frequent basis.

9. The method of claim 8, wherein fingerprints that do not sufficiently frequently match messages are removed.

10. The method of claim 1, wherein the classification rules include positive score rules and negative score rules, and wherein the customized classification rule execution order is determined solely for the positive score rules.

11. The method of claim 1, wherein the classification rules include positive score rules and negative score rules, and wherein the customized classification rule execution order is determined solely for the negative score rules.

12. The method of claim 1, further comprising:

an act of receiving a first subsequent message;

an act of saving the first subsequent message and a corresponding determined customized classification rule execution order for the first subsequent message;

an act of receiving a second subsequent message; and an act of determining that the second subsequent message matches both the originally received message and the first subsequent message.

13. The method of claim 12, further comprising applying a combination of the customized classification rule execution order of the original message and the customized classification rule execution order of the first subsequent message.

14. The method of claim 12, further comprising applying at least one of the customized classification rule execution order of the original message and the customized classification rule execution order of the first subsequent message, according to which is the most similar to the second subsequent message's customized classification rule execution order.

15. The method of claim 12, further comprising an act of applying at least one of the customized classification rule execution order of the original message and the customized classification rule execution order of the first subsequent message, according to which message is the most similar to the second subsequent message.

16. A computer program product for implementing a method for identifying optimal ordering rules for previously processed data, the computer program product comprising one or more computer-readable storage media having stored thereon computer-executable instructions that, when executed by one or more processors of the computing system, cause the computing system to perform the method, the method comprising:

identifying one or more specific characteristics of a message received via a computer network;

fingerprinting the message based at least in part on the identified one or more specific characteristics of the message;

comparing the message's fingerprint to one or more stored message fingerprints generated from previously received messages, wherein the comparison determines that the fingerprint matches one or more of the stored fingerprints;

accessing a previously generated customized classification rule execution order corresponding to the matched fingerprint, the customized classification rule execution order having been determined by executing a plurality of classification rules upon the previously received messages;

sequentially applying one or more of the plurality of classification rules according to the accessed customized classification rule execution order to the message; and determining a classification for the message based at least in part on the sequential application of the one or more of the plurality of classification rules.

17. The computer program product of claim 16, further comprising refining the customized classification rule execution order based on the execution of the customized classification rule execution order on the received message.

18. The computer program product of claim 16, further comprising an act of storing a new rule execution order based on the message classification.

19. The computer program product of claim 16, further comprising:

an act of receiving a subsequent message;

an act of determining that the original message is included in the subsequent message; and an act of applying the customized classification rule execution order of the original message.

20. A computer system comprising the following:

one or more processors;

system memory;

one or more computer-readable storage media having stored thereon computer-executable instructions that, when executed by the one or more processors, causes the computing system to perform a method for generating a customized classification rule execution order, the method comprising the following:

identifying one or more specific characteristics of a message received via a computer network;

fingerprinting the message based at least in part on the identified one or more specific characteristics of the message;

comparing the message's fingerprint to one or more stored message fingerprints generated from previously received messages, wherein the comparison determines that the fingerprint does not match the stored fingerprints;

applying a plurality of classification rules to the message to determine a classification for the message, the rules applied sequentially according to a predetermined rule execution order;

generating a customized classification rule execution order based on the results of the sequential application in the predetermined order of the plurality of classification rules to the message, the customized classification rule execution order defining a new sequential order of the classification rules that optimally identifies the message's class by applying the fewest number of rules of the customized classification rule execution order when applied sequentially to the message;

associating the generated customized classification order with the fingerprint for the message;

fingerprinting a subsequently received message;

determining that fingerprint of the subsequently received message matches the fingerprint generated for the original message; and using the generated customized classification rule execution order to process the subsequently received message.

\* \* \* \* \*